United States Patent
Hawley

(10) Patent No.: US 12,305,750 B1
(45) Date of Patent: May 20, 2025

(54) VEHICLE COASTDOWN CONTROL SYSTEM

(71) Applicant: TOYOTA MOTOR ENGINEERING & MANUFACTURING NORTH AMERICA, INC., Plano, TX (US)

(72) Inventor: Thomas S. Hawley, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/586,399

(22) Filed: Feb. 23, 2024

(51) Int. Cl.
| | |
|---|---|
| *F16H 61/16* | (2006.01) |
| *F16H 59/44* | (2006.01) |
| *F16H 59/54* | (2006.01) |
| *F16H 59/60* | (2006.01) |

(52) U.S. Cl.
CPC ............. *F16H 61/16* (2013.01); *F16H 59/44* (2013.01); *F16H 59/54* (2013.01); *F16H 59/60* (2013.01); *F16H 2059/605* (2013.01); *F16H 2061/166* (2013.01)

(58) Field of Classification Search
CPC ............... F16H 61/16; F16H 2061/166; F16H 2061/161; F16H 59/44; F16H 59/54; F16H 59/60; F16H 59/66; F16H 2059/605; F16H 2059/666; B60W 40/04; B60W 2050/0068
See application file for complete search history.

(56) References Cited

U.S. PATENT DOCUMENTS

| | | | |
|---|---|---|---|
| 5,445,576 A | 8/1995 | Motamedi et al. | |
| 6,070,118 A | 5/2000 | Ohta et al. | |
| 6,090,008 A | 7/2000 | Hoshiya et al. | |
| 6,174,262 B1 * | 1/2001 | Ohta ........................ | F16H 61/16 |
| | | | 477/120 |
| 6,626,797 B2 | 9/2003 | Shiiba et al. | |
| 7,935,024 B2 | 5/2011 | Winkel et al. | |
| 9,340,196 B2 | 5/2016 | Kawamoto et al. | |
| 9,791,038 B2 | 10/2017 | Kim | |
| 10,024,424 B2 | 7/2018 | Lowndes et al. | |

(Continued)

FOREIGN PATENT DOCUMENTS

| | | | | |
|---|---|---|---|---|
| CN | 113879310 A | * | 1/2022 | |
| DE | 10327438 B4 | * | 4/2020 | ............ B60W 10/02 |

OTHER PUBLICATIONS

CN113879310 translation.*
DE 10327438 translation.*

*Primary Examiner* — Timothy Hannon
(74) *Attorney, Agent, or Firm* — HAYNES AND BOONE, LLP

(57) ABSTRACT

A system for controlling a vehicle includes: the vehicle, at least one forward-looking sensor disposed within the vehicle, and a positioning system disposed within the vehicle. The system also includes a processor disposed within the vehicle and configured to: during deceleration of the vehicle, determine, based on inputs from the at least one forward-looking sensor or the positioning system, whether it is likely that a driver of the vehicle will stop decelerating the vehicle and will instead accelerate the vehicle. If it is likely that the driver will accelerate, the processor is configured to inhibit the downshifting of the vehicle's transmission.

18 Claims, 10 Drawing Sheets

(56) References Cited

U.S. PATENT DOCUMENTS

| | | | |
|---|---|---|---|
| 10,144,422 B2 | 12/2018 | Jerger et al. | |
| 10,400,888 B2 | 9/2019 | Jerger | |
| 10,457,286 B1 | 10/2019 | Mayhew et al. | |
| 10,661,776 B1 | 5/2020 | Kook et al. | |
| 10,821,959 B2 | 11/2020 | Engstrom | |
| 10,990,098 B2 | 4/2021 | Kishi et al. | |
| 11,261,960 B2 * | 3/2022 | Park | F16H 59/70 |
| 2018/0274666 A1 * | 9/2018 | Schweikl | F16H 61/16 |
| 2020/0307542 A1 * | 10/2020 | Engstrom | F16H 61/0213 |
| 2020/0391592 A1 * | 12/2020 | Jeon | F16H 59/60 |

* cited by examiner

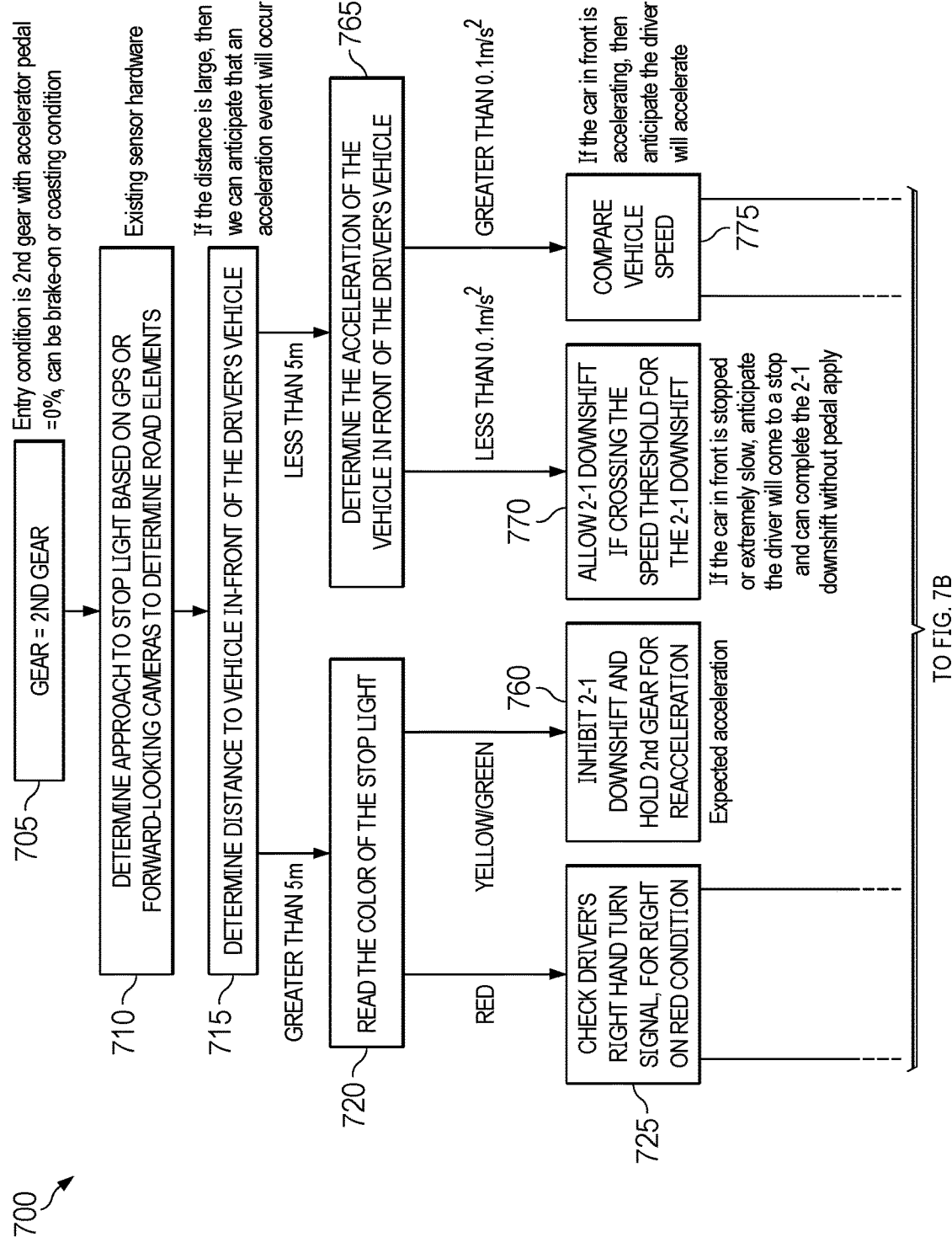

VEHICLE COASTDOWN CONTROL SYSTEM

TECHNICAL FIELD

The subject matter described herein relates to devices and methods for controlling the downshift of a motor vehicle at low speed, based on the driving scene ahead of the vehicle. This technology has particular but not exclusive utility for cars and trucks.

BACKGROUND

Low speed downshift control is one of the most difficult items to control for driveability. During coastdown, if the accelerator is applied during downshifting (e.g., downshifting between second gear and first gear) a hesitation can occur, where the time elapsed between applying the accelerator and the start of acceleration can be anywhere from 750 to 1000 milliseconds. This delay is caused by delaying torque rising until the shift is complete. It is important to complete the shift before the accelerator pedal input is applied. This particularly applies to the 2-1 downshift, which may be a worst case scenario for torque reduction.

Thus, a need exists for improved downshift control systems that address the foregoing and other concerns.

The information included in this Background section of the specification, including any references cited herein and any description or discussion thereof, is included for technical reference purposes only and is not to be regarded as limiting.

SUMMARY

The present disclosure provides a coastdown control system that uses the driving scene ahead of the vehicle to gauge whether the driver is likely about to stop the vehicle, or whether it is more probable that the driver will accelerate. The coastdown control system may for example inhibit the 2-1 downshift when it is anticipated that driver will apply the accelerator pedal to reaccelerate. This may occur for example during a rolling stop at a stop sign or traffic light, or during stop-and-go traffic when there are vehicles ahead of the ego vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for controlling a vehicle. The system includes the vehicle, at least one forward-looking sensor disposed within the vehicle, and a positioning system disposed within the vehicle. The system also includes a processor disposed within the vehicle and configured to: during a deceleration of the vehicle, determine, based on inputs from the at least one forward-looking sensor or the positioning system, whether it is likely that a driver of the vehicle will stop decelerating the vehicle and will instead accelerate the vehicle; and if it is likely that the driver of the vehicle will stop decelerating the vehicle and will instead accelerate the vehicle, inhibit a downshifting of a transmission of the vehicle. Other embodiments of this aspect include corresponding computer systems, apparatus, and computer programs recorded on one or more computer storage devices, each configured to perform the actions of the methods.

Implementations may include one or more of the following features. In some embodiments, determining whether it is likely that a driver of the vehicle will stop decelerating the vehicle and will instead accelerate the vehicle involves determining, with the at least one forward-looking sensor or the positioning system, that the vehicle is approaching a stop sign. In some embodiments, determining whether it is likely that a driver of the vehicle will stop decelerating the vehicle and will instead accelerate the vehicle involves determining, with the at least one forward-looking sensor or the positioning system, that the vehicle is approaching a traffic light. In some embodiments, determining whether it is likely that a driver of the vehicle will stop decelerating the vehicle and will instead accelerate the vehicle involves determining that a turn signal of the vehicle is activated. In some embodiments, determining whether it is likely that a driver of the vehicle will stop decelerating the vehicle and will instead accelerate the vehicle involves determining, with the at least one forward-looking sensor, that the vehicle is approaching a second vehicle. In some embodiments, determining whether it is likely that a driver of the vehicle will stop decelerating the vehicle and will instead accelerate the vehicle involves determining, with the at least one forward-looking sensor, that the second vehicle has an acceleration greater than a threshold acceleration. In some embodiments, determining whether it is likely that a driver of the vehicle will stop decelerating the vehicle and will instead accelerate the vehicle involves determining, with the at least one forward-looking sensor, whether the vehicle has a speed greater than a threshold speed. In some embodiments, determining whether it is likely that a driver of the vehicle will stop decelerating the vehicle and will instead accelerate the vehicle involves determining that, for greater than a threshold duration, a torque on a brake of the vehicle exceeds a torque threshold and a rate of change of the torque on the brake is greater than zero. In some embodiments, the at least one forward-looking sensor may include a camera, radar, or lidar. In some embodiments, the downshifting of the transmission of the vehicle is a downshifting from second gear to first gear. Implementations of the described techniques may include hardware, a method or process, or computer software on a computer-accessible medium.

One general aspect includes a method for controlling a vehicle. The method includes, with a processor disposed within the vehicle: during a deceleration of the vehicle, determining, based on inputs from at least one forward-looking sensor or a positioning system, whether it is likely that a driver of the vehicle will stop decelerating the vehicle and will instead accelerate the vehicle; and if it is likely that the driver of the vehicle will stop decelerating the vehicle and will instead accelerate the vehicle, inhibiting a downshifting of a transmission of the vehicle. Other embodiments of this aspect include corresponding computer systems, apparatus, and computer programs recorded on one or more computer storage devices, each configured to perform the actions of the methods.

Implementations may include one or more of the following features. In some embodiments, determining whether it is likely that a driver of the vehicle will stop decelerating the vehicle and will instead accelerate the vehicle involves determining, with the at least one forward-looking sensor or the positioning system, that the vehicle is approaching a stop sign. In some embodiments, determining whether it is likely that a driver of the vehicle will stop decelerating the vehicle and will instead accelerate the vehicle involves determining, with the at least one forward-looking sensor or the positioning system, that the vehicle is approaching a traffic light. In some embodiments, determining whether it is likely that a driver of the vehicle will stop decelerating the vehicle and will instead accelerate the vehicle involves determining that a turn signal of the vehicle is activated. In some embodiments, determining whether it is likely that a driver of the vehicle will stop decelerating the vehicle and will instead accelerate the vehicle involves determining, with the at least one forward-looking sensor, that the vehicle is approaching a second vehicle. In some embodiments, determining whether it is likely that a driver of the vehicle will stop decelerating the vehicle and will instead accelerate the vehicle involves determining, with the at least one forward-looking sensor, that the second vehicle has an acceleration greater than a threshold acceleration. In some embodiments, determining whether it is likely that a driver of the vehicle will stop decelerating the vehicle and will instead accelerate the vehicle involves determining, with the at least one forward-looking sensor, whether the vehicle has a speed greater than a threshold speed. In some embodiments, determining whether it is likely that a driver of the vehicle will stop decelerating the vehicle and will instead accelerate the vehicle involves determining that, for greater than a threshold duration, a torque on a brake of the vehicle exceeds a torque threshold and a rate of change of the torque on the brake is greater than zero. In some embodiments, the at least one forward-looking sensor may include a camera, radar, or lidar. Implementations of the described techniques may include hardware, a method or process, or computer software on a computer-accessible medium.

One general aspect includes. A vehicle that includes at least one forward-looking sensor disposed within the vehicle; a positioning system disposed within the vehicle; and a processor disposed within the vehicle and configured to: during a deceleration of the vehicle, determine, based on inputs from the at least one forward-looking sensor or the positioning system, whether it is likely that a driver of the vehicle will stop decelerating the vehicle and will instead accelerate the vehicle; and if it is likely that the driver of the vehicle will stop decelerating the vehicle and will instead accelerate the vehicle, inhibit a downshifting of a transmission of the vehicle. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the coastdown control system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
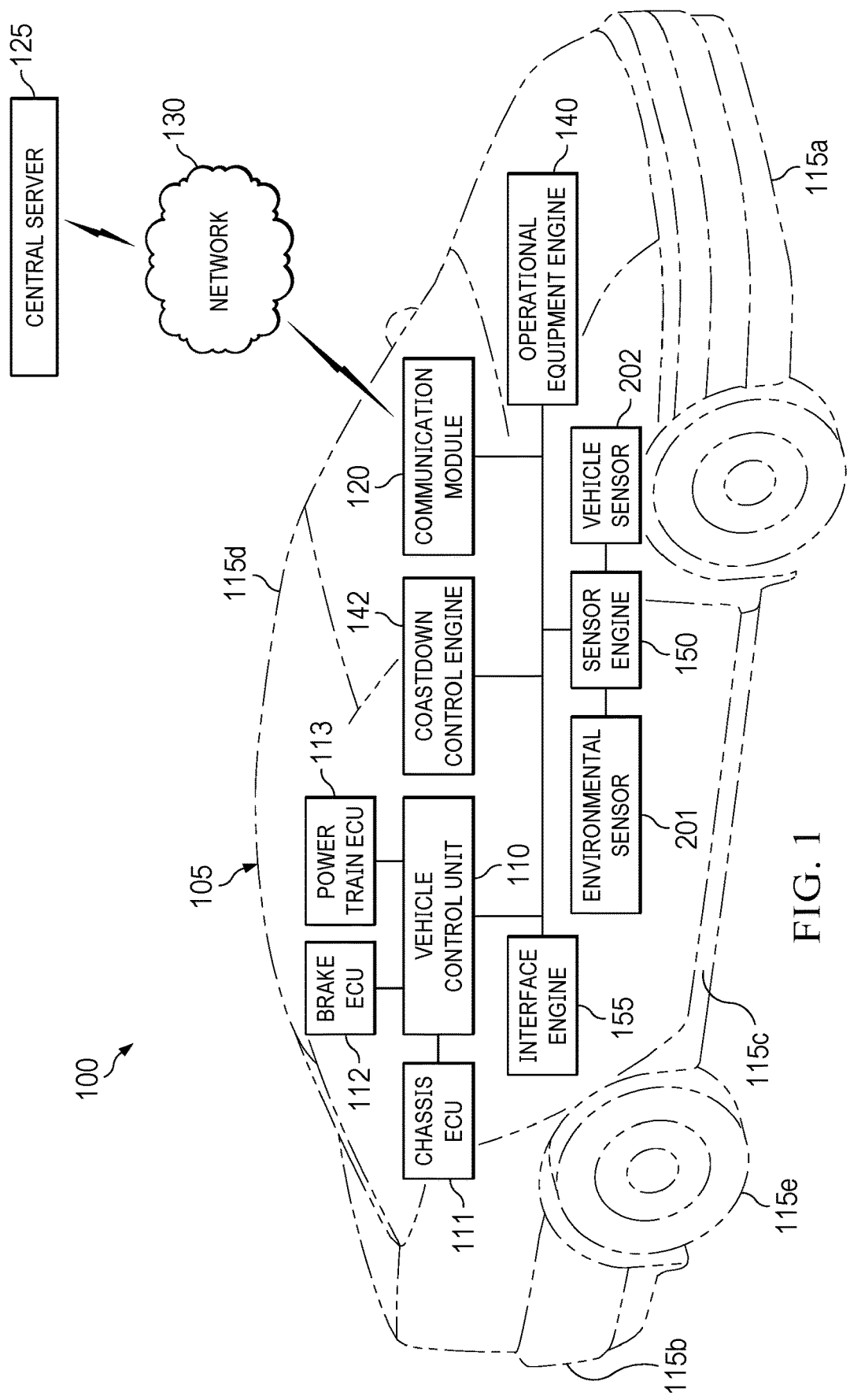
FIG. 1 is a diagrammatic illustration, in a block diagram form, of a coastdown control system in accordance with at least one embodiment of the present disclosure.

In accordance with at least one embodiment of the present disclosure, a coastdown control system is provided that uses the driving scene ahead of the vehicle (including stop signs, traffic lights, and other vehicles) to gauge driver intent-specifically, whether the driver is likely about to stop the vehicle, or whether it is more probable that the driver will accelerate. One goal of the coastdown control system is to use these road and traffic condition to better understand the driver's intention and when the accelerator pedal will be applied. The control may for example inhibit the 2-1 downshift (e.g., the downshift from second gear to first gear) when it is anticipated that driver will apply the accelerator pedal to reaccelerate. This may occur for example during a rolling stop at a stop sign or traffic light, or during stop-and-go traffic when there are vehicles ahead of the ego vehicle.

The closest related technology in current vehicles may be the base coastdown control logic that uses speed to command downshifting. Some current vehicles also have control logic to change activation of an engine start/stop system based on proximity to a stop sign or yield sign.

By contrast, the coastdown control system of the present disclosure interprets the environment ahead of the vehicle and allows the coastdown (e.g., the 2-1 downshift) to occur when it is determined the driver will likely be coming to a complete stop, and otherwise inhibits the 2-1 downshift at low speeds (e.g., 3 miles per hour or less), in order to minimize occurrence of the situation when the driver applies the accelerator pedal during a coast downshift.

Current smart cruise control systems (e.g., Toyota Safety Sense (TSS)) may be used generally on highways and non-highway roads, and may for example include a forward-looking camera capable of detecting and interpreting traffic lights and road signs, and a forward-looking radar capable of detecting the position, speed, and acceleration of vehicles ahead of the ego vehicle. A global positioning system (GPS) may also be present that, for example, knows the locations of stop signs and traffic lights. The coastdown control system makes use of these same systems, and is thus capable of sensing traffic lights, stop signs, and other indications that the driver may be about to either stop or re-accelerate.

The present disclosure aids substantially in human-machine interaction, by preventing the time lag between accelerator input and the start of acceleration that can occur when the vehicle initiates a 2-1 downshift (e.g., a shift from second gear to first gear) at low coasting speeds, when the driver in fact intends to re-accelerate the vehicle. Implemented on one or more processors within the vehicle, the coastdown control system disclosed herein provides practical, real-time, intelligent inhibition or enablement of the 2-1 downshift. This improved coastdown control capability transforms a laggy acceleration input into one that is more responsive to the human driver, without the normally routine need to downshift at inappropriate times. This unconventional approach improves the functioning of the vehicle, by reducing accelerator lag and thus improving responsiveness at low speeds.

The coastdown control system may be implemented as a combination of hardware and/or software modules, and operated by a control process executing on a processor circuit that accepts user inputs from the vehicle operator, and that is in communication with location services and on-board sensors. In that regard, the control process performs certain specific operations in response to different inputs made at different times. Certain structures, functions, and operations of the processor circuit, sensors, and user input systems are known in the art, while others are recited herein to enable novel features or aspects of the present disclosure with particularity. In some instances, certain outputs of the coastdown control system may be shown on a display, indicated with audible tones or indicator lights, or otherwise communicated to the driver.

These descriptions are provided for exemplary purposes only, and should not be considered to limit the scope of the coastdown control system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration, in a block diagram form, of a coastdown control system, in accordance with at least one embodiment of the present disclosure. In an example, a coastdown control system is referred to by the reference numeral 100 and includes a vehicle (or ego vehicle) 105, such as an automobile, and a vehicle control unit (VCU) 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the coastdown control system 100.

The term "engine" is meant herein to refer to an agent, instrument, or combination of either, or both, agents and instruments that may be associated to serve a purpose or accomplish a task-agents and instruments may include sensors, actuators, switches, relays, motors or power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125. In some cases, an engine may incorporate or make use of multiple processors or software modules.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a coastdown control engine 142, the operation of which will be described below.

It is understood that other components or arrangements of components may be found in a vehicle 105, and that at least some of the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110. In some implementations, the coastdown control engine 142 may be or include software running on the power train ECU 113.

Before continuing, it should be noted that the examples described above are provided for purposes of illustration, and are not intended to be limiting. Other devices and/or device configurations may be utilized to carry out the operations described herein.

Figure 2:
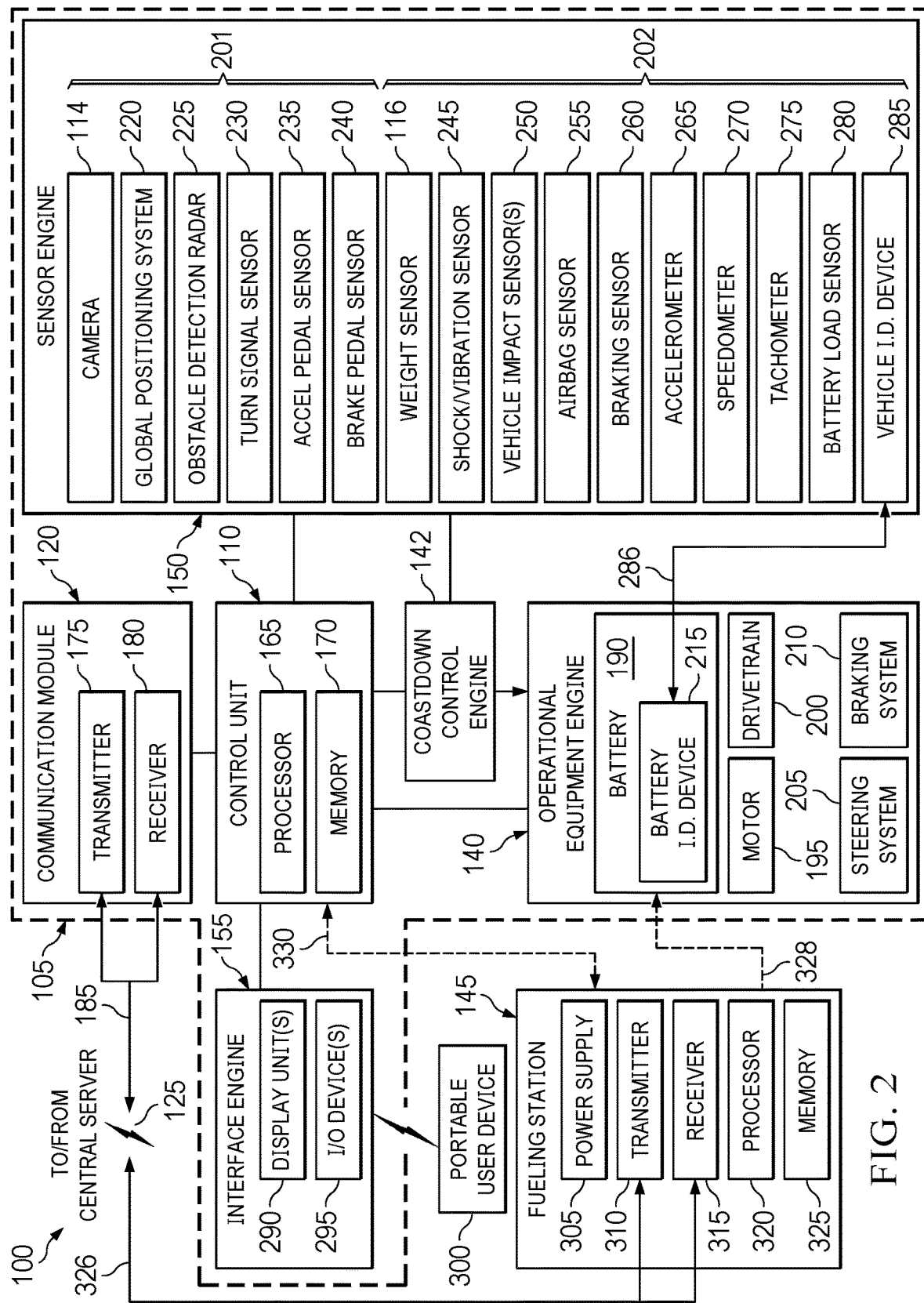
FIG. 2 is a diagrammatic illustration, in a block-diagram form, of at least a portion of the coastdown control system of FIG. 1, in accordance with at least one embodiment of the present disclosure.

FIG. 2 is a diagrammatic illustration, in a block-diagram form, of at least a portion of the coastdown control system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain or transmission 200, a steering system 205, and a braking system 210. In some vehicles, the vehicle battery 190 may provide electrical power to the motor 195 to drive the wheels 115e of the vehicle 105 via the drivetrain 200. In some examples, the motor 195 is an internal combustion motor and the battery operates a starter of the motor 195.

In some examples, instead of or in addition to providing power to the motor 195, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.). The sensor engine 150 may also include one or more obstacle detection sensors 225 (e.g., one or more cameras, lidars, radars, proximity sensors, or other sensors) configured to detect obstacles in the path of the vehicle. The sensor engine 150 may also include a turn signal sensor 230. The sensor engine 150 may also include an acceleration pedal deflection sensor 235 and brake pedal deflection sensor 240. In some implementations, the obstacle detection sensor(s) 225, turn signal detection sensor 230, acceleration pedal deflection sensor 235, and brake pedal deflection sensor 240 are used as inputs to an intelligent cruise control system such as TSS, which is capable of controlling the steering, brake, and accelerator of the vehicle. In other implementations, the obstacle detection sensor(s) 225, turn signal sensor 230, acceleration pedal deflection sensor 235, and brake pedal deflection sensor 240 can be used instead or in addition as inputs to the coastdown control engine 142, which is capable of controlling the gear shifting of the vehicle. The sensor engine 150 may also include a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a forward-looking 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin, engine compartment, battery, or fuel tank. Sub-components of the sensor engine 150 may be deployed at any operational area where information on the driving of the vehicle 105 may occur. Readings from the sensor engine 150 may be fed back to the vehicle control unit 110, brake ECU 112, power train ECU or hybrid ECU 113, and/or coastdown control engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or coastdown control engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110 and/or the coastdown control engine 142. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed or angular velocity (e.g., in revolutions-per-minute) of the vehicle 105's motor 195 and to communicate the angular velocity information to the vehicle control unit 110 and/or the coastdown control engine 142. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 may be adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which may be operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dashboard or head unit, a steering wheel, or another component of the vehicle 105, and/or similar components. Other examples of subcomponents that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

Also visible is a vehicle fueling station 145, which supplies fuel or electrical energy 328 to the operational equipment engine 140, and may include such components as a power supply 305, transmitter 310, receiver 315, processor 320, and memory 325.

The coastdown control system 100 also includes a coastdown control engine 142, the operation of which will be described below. In some embodiments, the coastdown control engine 142 comprises a standalone housing with its own processor and memory. In other embodiments, the coastdown control engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
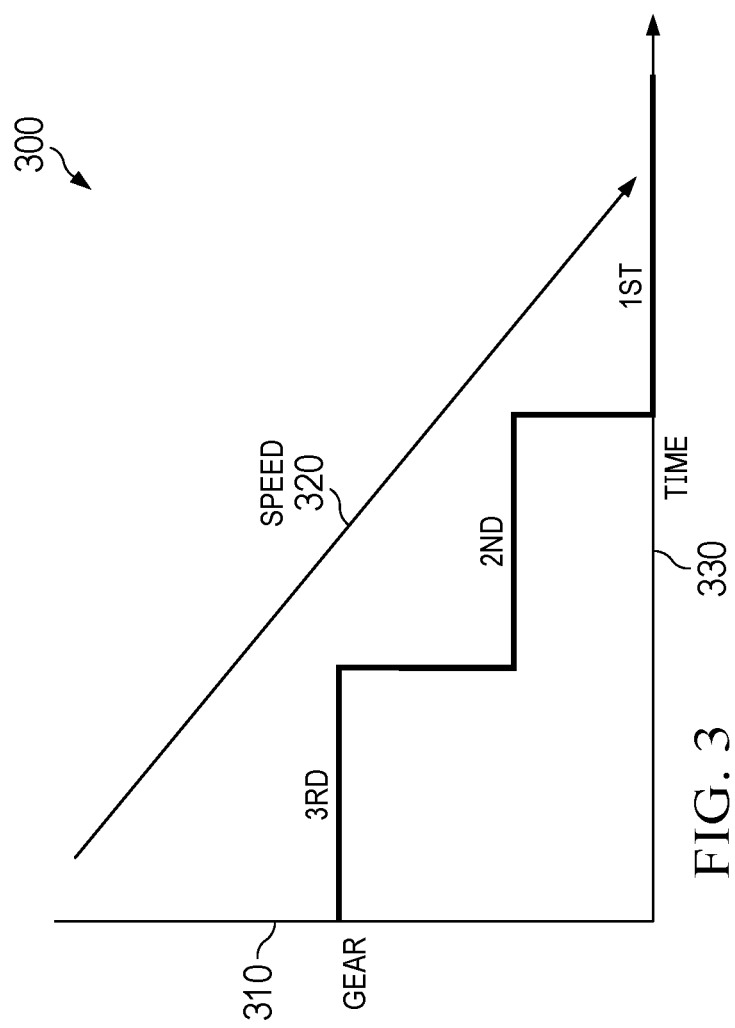
FIG. 3 is a graphical representation of the deceleration of a vehicle, in accordance with at least one embodiment of the present disclosure.

FIG. 3 is a graphical representation 300 of the deceleration of a vehicle, in accordance with at least one embodiment of the present disclosure. In the graphical representation 300, the transmission gear 310 and vehicle speed 320 are shown as a function of time. As the vehicle decelerates, the transmission shifts from third gear to second gear, and then from second gear to first gear. This represents a nominal stopping sequence for the vehicle, as for example at a stop sign or red light.

Figure 4:
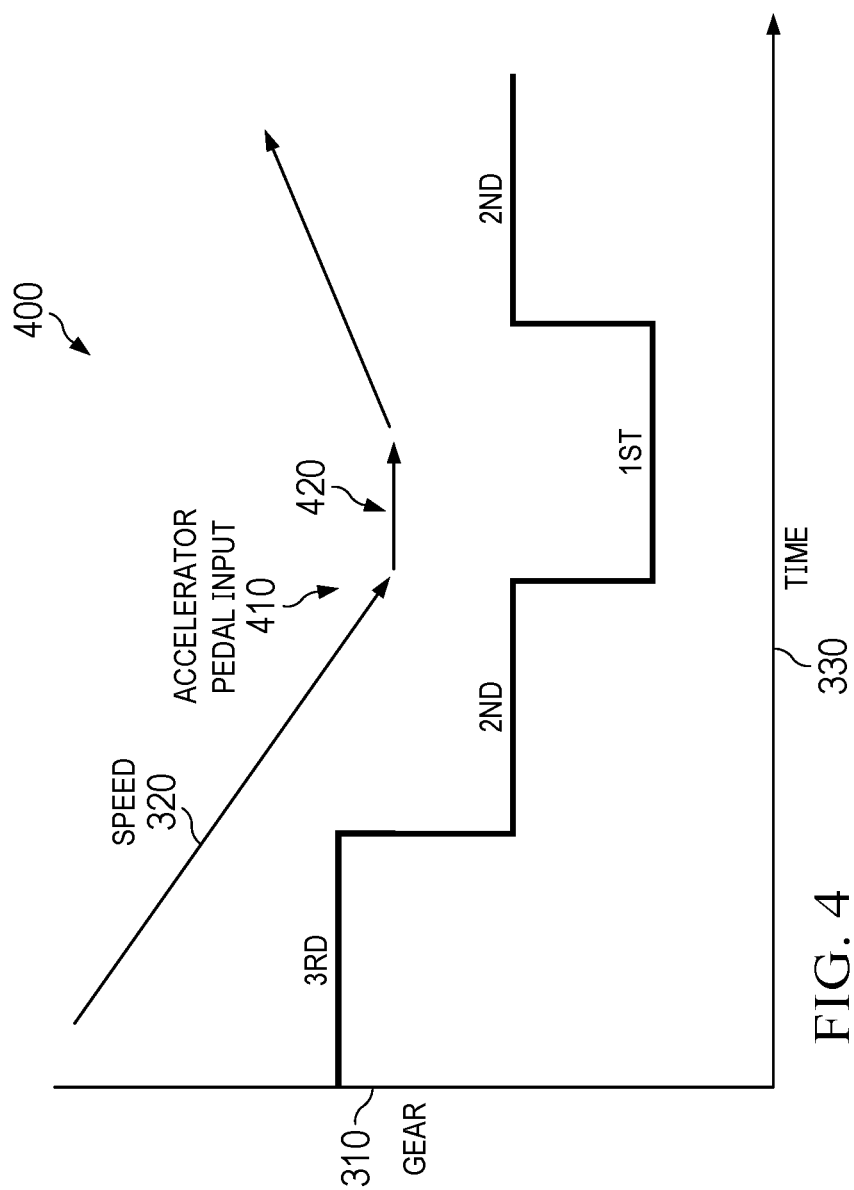
FIG. 4 is a graphical representation of the deceleration and re-acceleration of a vehicle, in accordance with at least one embodiment of the present disclosure.

FIG. 4 is a graphical representation 400 of the deceleration and re-acceleration of a vehicle, in accordance with at least one embodiment of the present disclosure. In the graphical representation 400, the transmission gear 310 and vehicle speed 320 are shown as a function of time. As the vehicle decelerates, the transmission shifts from third gear to second gear, and then from second gear to first gear. However, in the example shown in FIG. 4, the driver provides an accelerator pedal input 410 during the downshift from second gear to first gear, resulting in a lag time 420 during which no acceleration occurs. After the lag time 410, the vehicle begins re-accelerating. Depending on the implementation, and on the timing of the accelerator pedal input relative to the 2-1 downshift, the lag time 410 can be anywhere from a few milliseconds to as long as 1000 milliseconds. Such long lag times may be associated with poor responsiveness, reduced safety, and a unsatisfactory driving experience.

Figure 5:
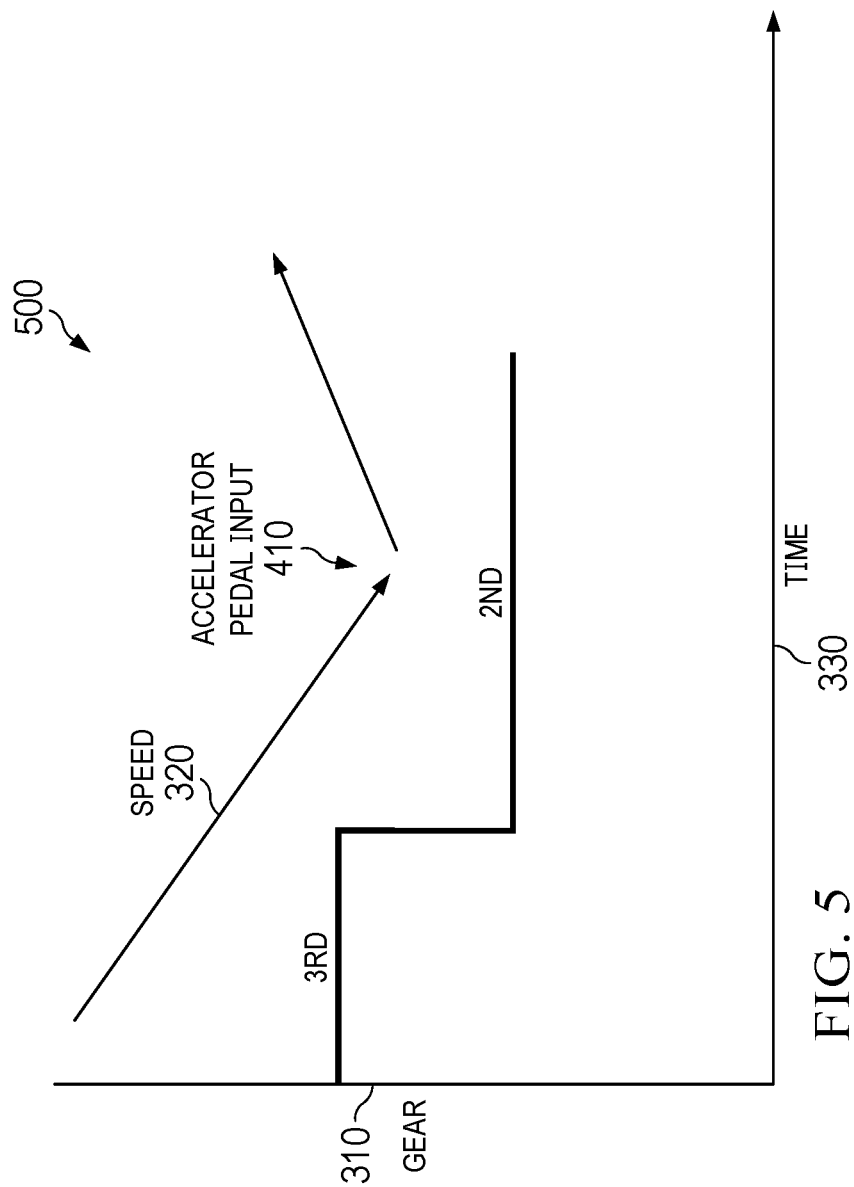
FIG. 5 is a graphical representation of the deceleration and re-acceleration of a vehicle, in accordance with at least one embodiment of the present disclosure.

FIG. 5 is a graphical representation 500 of the deceleration and re-acceleration of a vehicle, in accordance with at least one embodiment of the present disclosure. In the graphical representation 400, the transmission gear 310 and vehicle speed 320 are shown as a function of time. As the vehicle decelerates, the transmission shifts from third gear to second gear. However, in the example shown in FIG. 5, the coastdown control system has inhibited the downshift from second gear to first gear. Thus, when the driver provides the accelerator pedal input 410, the vehicle is still in gear rather than being in the midst of a downshift. Thus, the speed of the vehicle begins rising when the accelerator pedal input 410 is provided, with little or no perceptible lag. Thus, the coastdown control system provides a more responsive, safer, and more satisfying driving experience.

Figure 6:
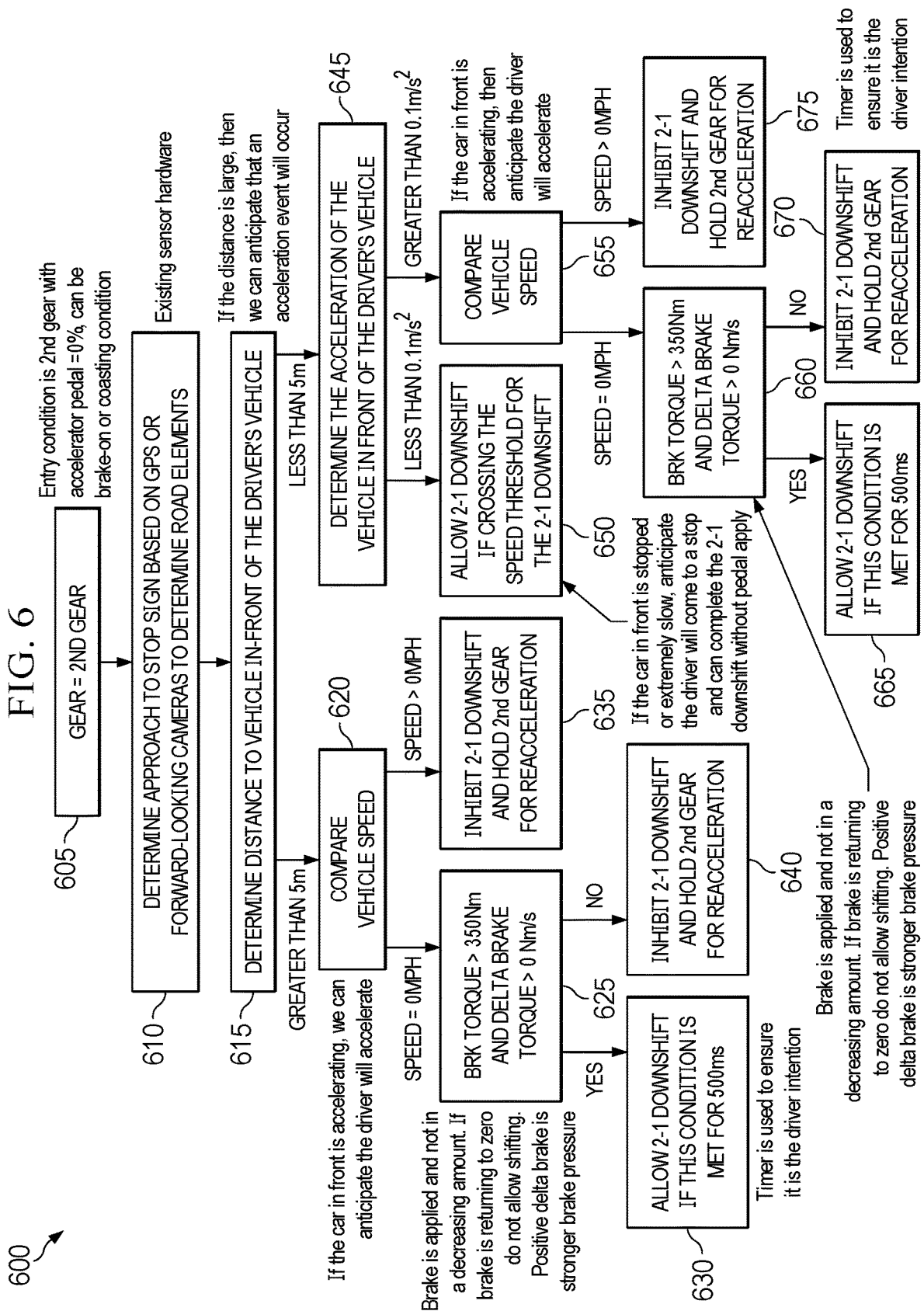
FIG. 6 is a flow diagram of an example coastdown control method for a stop sign condition, in accordance with at least one embodiment of the present disclosure.

FIG. 6 is a flow diagram of an example coastdown control method 600 for a stop sign condition, in accordance with at least one embodiment of the present disclosure. It is understood that the blocks of method 600 may be performed in a different order than shown in FIG. 6, additional blocks can be provided before, during, and after the blocks, and/or some of the blocks described can be replaced or eliminated in other embodiments. One or more of blocks of the method 600 can be carried by one or more devices and/or systems described herein, such as components of the coastdown control engine 142, vehicle control unit 110, power train ECU 113, and/or processor circuit 950.

In block 605, the method 600 begins with the vehicle in second gear and traveling at low speed (e.g., 3 miles per hour or less), such that a 2-1 downshift is likely to occur. Execution then proceeds to block 610.

In block 610, the method 600 includes determining that the vehicle is approaching a stop sign. This determination may for example be based on GPS data and/or on one or more forward-looking cameras. Execution then proceeds to block 615.

In block 615, the method 600 includes determining the distance to the closest vehicle in front of the ego vehicle. If this distance is greater than a threshold value (e.g., greater than 5 meters), execution then proceeds to block 620. This may include cases where there is no vehicle in front of the ego vehicle. If the distance is less than or equal to 5 meters, execution then proceeds to block 645.

In block 620, the method 600 includes determining the speed of the vehicle in front of the ego vehicle. If the speed is zero (or less than a small threshold value), execution proceeds to block 625. If the speed is nonzero (or greater than the small threshold value), execution proceeds to block 635.

In block 625, the method 600 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 630. If this condition is not true for 500 milliseconds, then the brake is either not applied or is being released, and execution proceeds to block 640.

In block 630, the method 600 includes allowing the 2-1 downshift. The method 600 is not complete.

In block 635, the method 600 includes inhibiting the 2-1 downshift and holding second gear, such that the downshift event will not interfere with a possible acceleration request from the driver. The method 600 is now complete.

In block 640, the method 600 includes inhibiting the 2-1 downshift and holding second gear, such that the downshift event will not interfere with a possible acceleration request from the driver. The method 600 is now complete.

In block 645, the method 600 includes determining the acceleration of the vehicle in front of the ego vehicle. If this acceleration is less than a threshold value (e.g., less than 0.1 meters per second squared), execution proceeds to block 650. If the acceleration is equal to or greater than the threshold value, then execution proceeds to block 655.

In block 650, the method 600 includes allowing the 2-1 downshift if the ego vehicle is crossing the speed threshold for the 2-1 downshift. This is permitted because if the car in front of the ego vehicle is stopped, moving slowly, or decelerating, then the system can anticipate that the car in front will stop, and therefore that the driver of the ego vehicle will also stop. The method 600 is now complete.

In block 655, the method 600 includes determining the speed of the vehicle in front of the ego vehicle. If this speed is zero (or less than a small threshold), then execution proceeds to block 660. If this speed is nonzero (or greater than the small threshold value), then execution proceeds to block 675.

In block 660, the method 600 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 665. If this condition is not true for 500 milliseconds, then the brake is either not applied or is being released, and execution proceeds to block 670.

In block 665, the method 600 includes allowing the 2-1 downshift. The method 600 is now complete.

In block 670, the method 600 includes inhibiting the 2-1 downshift and holding second gear for an anticipated re-acceleration. The method 600 is now complete.

In block 675, the method 600 includes inhibiting the 2-1 downshift and holding second gear for an anticipated re-acceleration. The method 600 is now complete.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the blocks described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to provide practical control over the shifting of the vehicle at driving speed, the coastdown control system may need to operate on an 8 millisecond cycle or 125 Hz clock rate.

Figure 7B:
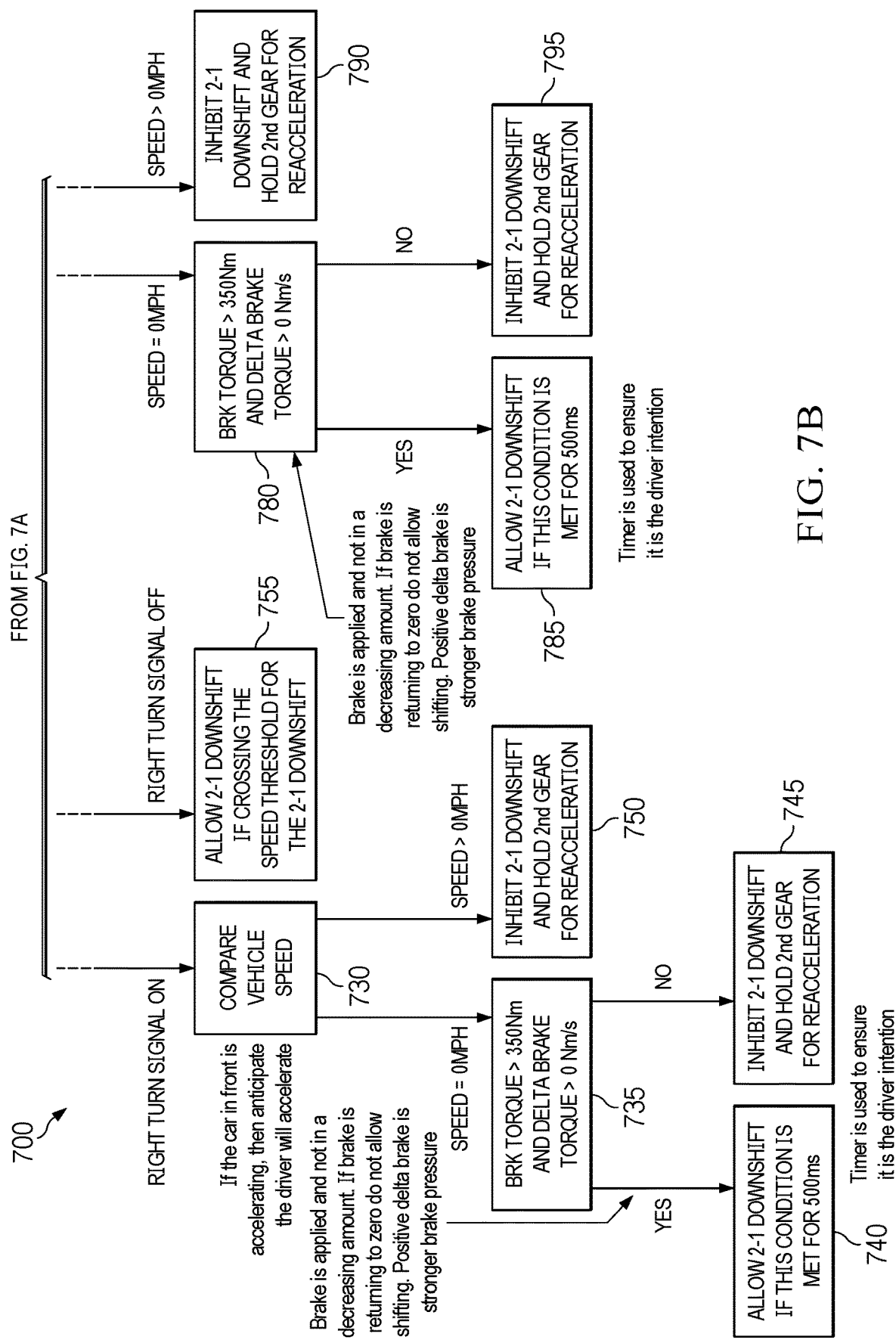
FIG. 7 is a flow diagram of an example coastdown control method for a traffic light condition, in accordance with at least one embodiment of the present disclosure.

FIG. 7 is a flow diagram of an example coastdown control method 700 for a traffic light condition, in accordance with at least one embodiment of the present disclosure.

In block 705, the method 700 begins with the vehicle in second gear and traveling at low speed (e.g., 3 miles per hour or less), such that a 2-1 downshift is likely to occur. Execution then proceeds to block 710.

In block 710, the method 700 includes determining that the vehicle is approaching a stop light. This determination may for example be based on GPS data and/or on one or more forward-looking cameras. Execution then proceeds to block 615.

In block 715, the method 700 includes determining the distance to the closest vehicle in front of the ego vehicle. If this distance is greater than a threshold value (e.g., greater than 5 meters), execution then proceeds to block 720. This may include cases where there is no vehicle in front of the ego vehicle. If the distance is less than or equal to 5 meters, execution then proceeds to block 765.

In block 720, the method 700 includes reading the color of the stop light. This may be done for example with a forward-looking camera. If the light is red, execution proceeds to block 725. If the light is yellow or green, execution proceeds to block 760.

In block 725, the method 700 includes checking whether the right-hand turn signal of the ego vehicle has been activated (e.g., by polling the turn signal sensor). If the right-hand turn signal is on, execution proceeds to block 730. If the right-hand turn signal is off, execution proceeds to block 755.

In block 730, the method 700 includes determining the speed of the vehicle ahead of the ego vehicle. If the speed is zero (or less than a small threshold value), execution proceeds to block 735. If the speed is nonzero (or greater than the small threshold value) or there is no vehicle in front of the ego vehicle, then the driver of the ego vehicle is likely to re-accelerate, and execution proceeds to block 750.

In block 735, the method 700 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 740. If this condition is not true for 500 milliseconds, then the brake is either not applied or is being released, and execution proceeds to block 745.

In block 740, the method 700 includes allowing the 2-1 downshift. The method 700 is now complete.

In block 745, the method 700 includes inhibiting the 2-1 downshift and holding second gear for a possible re-acceleration of the ego vehicle by the driver. The method 700 is now complete.

In block 750, the method 700 includes inhibiting the 2-1 downshift and holding second gear for a possible re-acceleration of the ego vehicle by the driver. The method 700 is now complete.

In block 755, the method 700 includes allowing the 2-1 downshift if the ego vehicle is crossing the speed threshold for the 2-1 downshift. The method 700 is now complete.

In block 760, the method 700 includes inhibiting the 2-1 downshift and holding second gear for a possible re-acceleration of the ego vehicle by the driver. The method 700 is now complete.

In block 765, the method 700 includes determining the acceleration of the vehicle in front of the ego vehicle. If the acceleration is less than a threshold value (e.g., less than 0.1 meter per second squared), then it is anticipated that the driver of the ego vehicle will stop the ego vehicle, and so execution proceeds to block 770. If the acceleration is greater than or equal to the threshold value (e.g., greater than or equal to 0.1 meter per second squared), execution proceeds to block 775.

In block 770, the method 700 includes allowing the 2-1 downshift if the ego vehicle is crossing the speed threshold for the 2-1 downshift. The method 700 is now complete.

In block 775, the method 700 includes determining the speed of the vehicle ahead of the ego vehicle. If the speed is zero (or less than a small threshold value), execution proceeds to block 780. If the speed is nonzero (or greater than the small threshold value) or there is no vehicle in front of the ego vehicle, then the driver of the ego vehicle is likely to re-accelerate, and execution proceeds to block 790.

In block 780, the method 700 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 785. If this condition is not true for 500 milliseconds, then the brake is either not applied or is being released, and execution proceeds to block 795.

In block 785, the method 700 includes allowing the 2-1 downshift. The method 700 is now complete.

In block 790, the method 700 includes inhibiting the 2-1 downshift in anticipation of a possible re-acceleration. The method 700 is now complete.

In block 795, the method 700 includes inhibiting the 2-1 downshift in anticipation of a possible re-acceleration. The method 700 is now complete.

Figure 8:
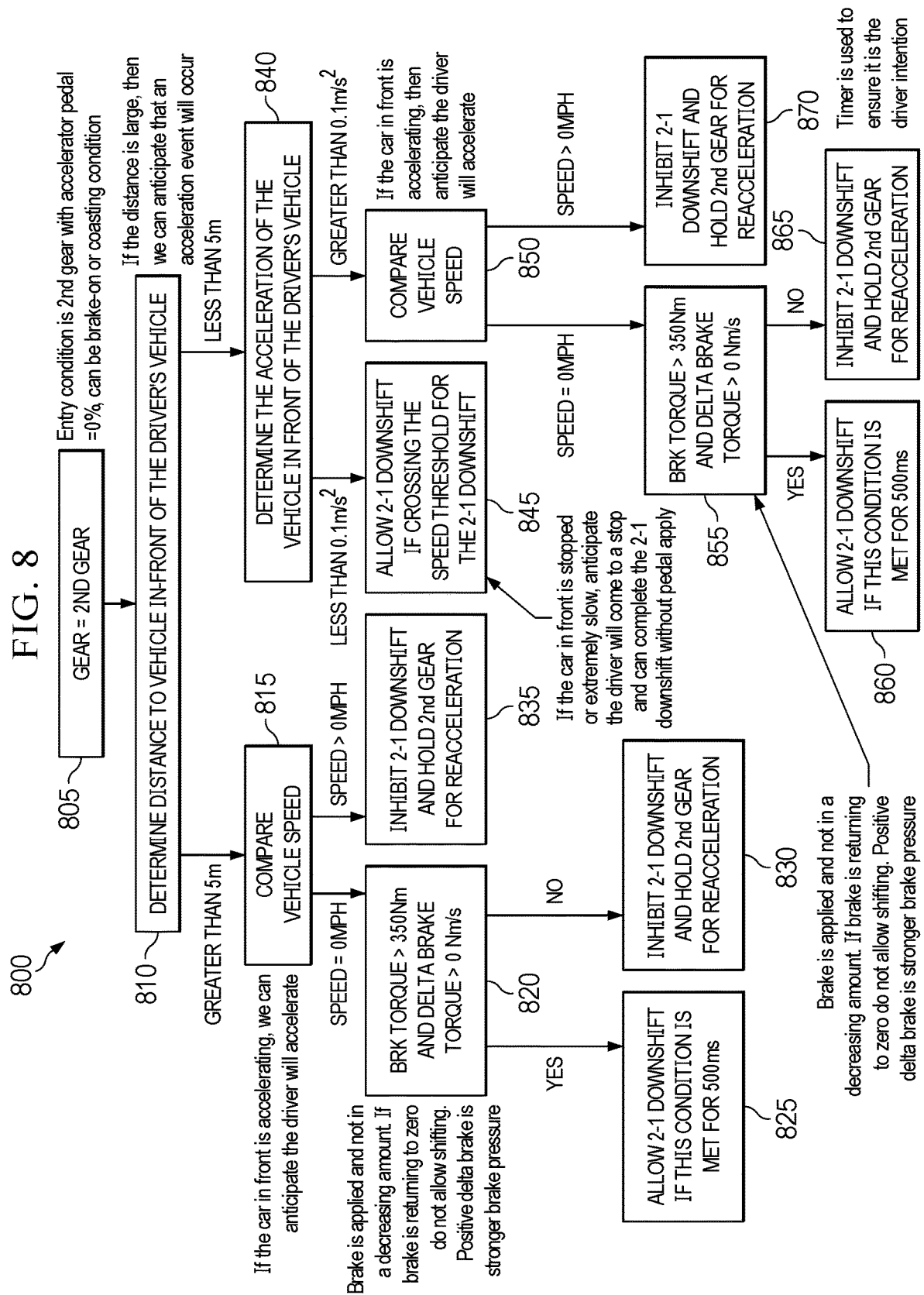
FIG. 8 is a flow diagram of an example coastdown control method for a following traffic condition (e.g., when the ego vehicle is following another car in stop-and-go traffic), in accordance with at least one embodiment of the present disclosure.

FIG. 8 is a flow diagram of an example coastdown control method 800 for a following traffic condition (e.g., when the ego vehicle is following another car in stop-and-go traffic), in accordance with at least one embodiment of the present disclosure.

In block 805, the method 800 begins with the vehicle in second gear and traveling at low speed (e.g., 3 miles per hour or less), such that a 2-1 downshift is likely to occur. Execution then proceeds to block 810.

In block 810, the method 800 includes determining the distance to the closest vehicle in front of the ego vehicle. If this distance is greater than a threshold value (e.g., greater than 5 meters), execution then proceeds to block 815. This may include cases where there is no vehicle in front of the ego vehicle. If the distance is less than or equal to 5 meters, execution then proceeds to block 840.

In block 815, the method 800 includes determining the speed of the vehicle ahead of the ego vehicle. If the speed is zero (or less than a small threshold value), execution proceeds to block 820. If the speed is nonzero (or greater than the small threshold value) or there is no vehicle in front of the ego vehicle, then the driver of the ego vehicle is likely to re-accelerate, and execution proceeds to block 835.

In block 820, the method 800 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 825. If this condition is not true for 500 milliseconds, then the brake is either not applied or is being released, and execution proceeds to block 830.

In block 825, the method 800 includes allowing the 2-1 downshift. The method 700 is now complete.

In block 830, the method 800 includes inhibiting the 2-1 downshift and holding second gear for a possible re-acceleration of the ego vehicle by the driver. The method 800 is now complete.

In block 835, the method 800 includes inhibiting the 2-1 downshift and holding second gear for a possible re-acceleration of the ego vehicle by the driver. The method 800 is now complete.

In block 840, the method 800 includes determining the acceleration of the vehicle in front of the ego vehicle. If the acceleration is less than a threshold value (e.g., less than 0.1 meter per second squared), then it is anticipated that the driver of the ego vehicle will stop the ego vehicle, and so execution proceeds to block 845. If the acceleration is greater than or equal to the threshold value (e.g., greater than or equal to 0.1 meter per second squared), execution proceeds to block 850.

In block 845, the method 800 includes allowing the 2-1 downshift if the ego vehicle is crossing the speed threshold for the 2-1 downshift. The method 800 is now complete.

In block 850, the method 800 includes determining the speed of the vehicle ahead of the ego vehicle. If the speed is zero (or less than a small threshold value), execution proceeds to block 855. If the speed is nonzero (or greater than the small threshold value) or there is no vehicle in front of the ego vehicle, then the driver of the ego vehicle is likely to re-accelerate, and execution proceeds to block 870.

In block 855, the method 800 includes determining whether the brake torque is greater than a threshold value (e.g., greater than 350 Newton-meters) and the change in brake torque is greater than or equal to zero. If this condition holds true for 500 milliseconds, then the brake is being applied in a nonzero amount, and execution proceeds to block 860. If this condition is not true for 500 milliseconds, then the brake is either not applied or is being released, and execution proceeds to block 865.

In block 860, the method 800 includes allowing the 2-1 downshift. The method 800 is now complete.

In block 865, the method 800 includes inhibiting the 2-1 downshift in anticipation of a possible re-acceleration. The method 800 is now complete.

In block 870, the method 800 includes inhibiting the 2-1 downshift in anticipation of a possible re-acceleration. The method 800 is now complete.

Figure 9:
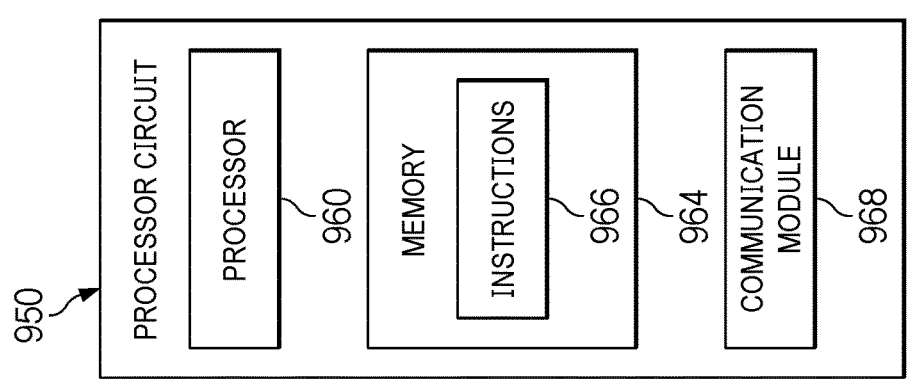
FIG. 9 is a schematic diagram of a processor circuit, in accordance with at least one embodiment of the present disclosure.

FIG. 9 is a schematic diagram of a processor circuit 950, in accordance with at least one embodiment of the present disclosure. The processor circuit 950 may be implemented in the coastdown control engine 142 or VCU 110 of FIGS. 1 and 2, the Power Train ECU 113 of FIG. 1, or in other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 968 can be an input/output (I/O) device. In some instances, the communication module 968 facilitates direct or indirect communication between various elements of the processor circuit 950 and/or the coastdown control system 100. The communication module 968 may communicate within the processor circuit 950 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the sensors may be accomplished using any suitable wireless or wired communication technology, e.g., a cable interface such as a USB, micro USB, Lightning, or Fire Wire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 10:
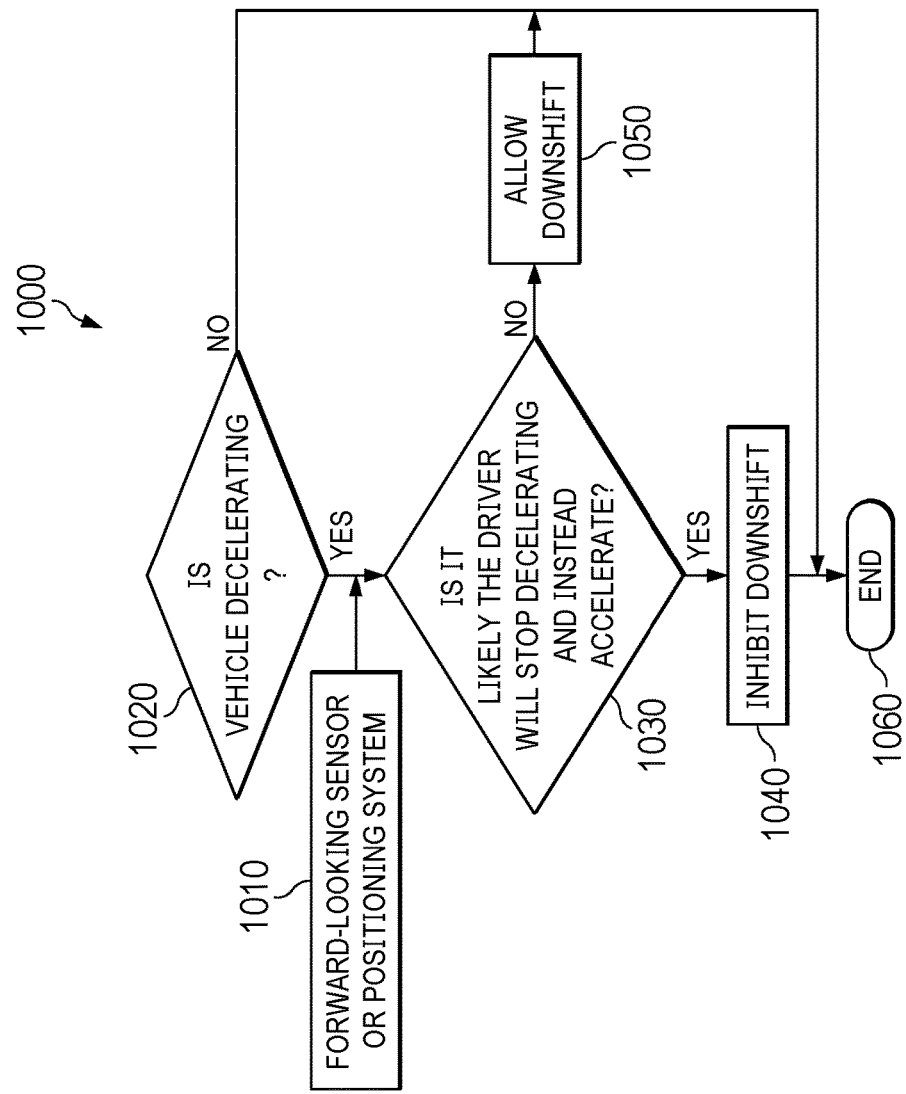
FIG. 10 is a flow diagram of an example coastdown control method, in accordance with at least one embodiment of the present disclosure.

FIG. 10 is a flow diagram of an example coastdown control method 1000, in accordance with at least one embodiment of the present disclosure.

In block 1020, the method 1000 includes determining whether the vehicle is decelerating. If yes, execution then proceeds to block 1030.

In block 1030, the method 1000 includes, based on inputs from a forward-looking sensor or positioning system 1010, determining whether it is likely that the driver will stop decelerating the vehicle and will instead accelerate the vehicle. If yes, execution proceeds to block 1040. If no, execution proceeds to block 1050.

In block 1040, the method 1000 includes inhibiting a downshift of the vehicle's transmission. Execution then proceeds to block 1060.

In block 1050, the method 1000 includes allowing the downshift of the vehicle's transmission. Execution then proceeds to block 1060.

In block 1060, the method 1000 is complete.

As will be readily appreciated by those having ordinary skill in the art after becoming familiar with the teachings herein, the coastdown control system advantageously provides an ability to inhibit the 2-1 downshift during low-speed deceleration, if it is anticipated that the driver will accelerate rather than stopping. Accordingly, when compared to existing assistive driving systems such as Toyota Safety Sense (TSS), the coastdown control system 100 may have a greatly reduced incidence of accelerator lag as a result of 2-1 downshifting, and thus provides greater value to the consumer. Depending on the implementation, a number of variations are possible on the examples and embodiments described above. For example, the technology may be applied to other downshifting events besides the 2-1 downshift, including but not limited to a 3-2 downshift, a 4-3 downshift, or a 5-4 downshift. The technology may also be applied to different vehicle types, including, three-wheeled vehicles, multi-wheeled vehicles, internal combustion vehicles, electric vehicles, and hybrid vehicles. Other variables and other logical or arithmetic operations may be employed than those described above, in order to provide the same or similar functions.

The logical operations making up the embodiments of the technology described herein are referred to variously as operations, steps, blocks, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the coastdown control system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the coastdown control system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for controlling a vehicle, the system comprising:
   the vehicle;
   at least one forward-looking sensor disposed within the vehicle;
   a positioning system disposed within the vehicle;
   a processor disposed within the vehicle and configured to:
      during a deceleration of the vehicle, determine, based on inputs from the at least one forward-looking sensor or the positioning system, whether it is predicted that a driver of the vehicle will stop decelerating the vehicle and will instead accelerate the vehicle; and
      if it is predicted that the driver of the vehicle will stop decelerating the vehicle and will instead accelerate the vehicle, inhibit a downshifting of a transmission of the vehicle,
      wherein determining whether it is predicted that the driver of the vehicle will stop decelerating the vehicle and will instead accelerate the vehicle involves determining whether, for greater than a threshold duration, a torque on a brake of the vehicle exceeds a torque threshold and a rate of change of the torque on the brake is greater than zero.

2. The system of claim 1, wherein determining whether it is predicted that the driver of the vehicle will stop decelerating the vehicle and will instead accelerate the vehicle involves determining, with the at least one forward-looking sensor or the positioning system, whether the vehicle is approaching a stop sign.

3. The system of claim 1, wherein determining whether it is predicted that the driver of the vehicle will stop decelerating the vehicle and will instead accelerate the vehicle involves determining, with the at least one forward-looking sensor or the positioning system, whether the vehicle is approaching a traffic light.

4. The system of claim 1, wherein determining whether it is predicted that the driver of the vehicle will stop decelerating the vehicle and will instead accelerate the vehicle involves determining whether a turn signal of the vehicle is activated.

5. The system of claim 1, wherein determining whether it is predicted that the driver of the vehicle will stop decelerating the vehicle and will instead accelerate the vehicle involves determining, with the at least one forward-looking sensor, whether the vehicle is approaching a second vehicle.

6. The system of claim 5, wherein determining whether it is predicted that the driver of the vehicle will stop decelerating the vehicle and will instead accelerate the vehicle involves determining, with the at least one forward-looking sensor, whether the second vehicle has an acceleration greater than a threshold acceleration.

7. The system of claim 5, wherein determining whether it is predicted that the driver of the vehicle will stop decelerating the vehicle and will instead accelerate the vehicle involves determining, with the at least one forward-looking sensor, whether the vehicle has a speed greater than a threshold speed.

8. The system of claim 1, wherein the at least one forward-looking sensor comprises a camera, radar, or lidar.

9. The system of claim 1, wherein the downshifting of the transmission of the vehicle is a downshifting from second gear to first gear.

10. A method for controlling a vehicle, the method comprising:
    with a processor disposed within the vehicle:
       during a deceleration of the vehicle, determining, based on inputs from at least one forward-looking sensor or a positioning system, whether it is predicted that a driver of the vehicle will stop decelerating the vehicle and will instead accelerate the vehicle; and
       if it is predicted that the driver of the vehicle will stop decelerating the vehicle and will instead accelerate the vehicle, inhibiting a downshifting of a transmission of the vehicle,
       wherein determining whether it is predicted that the driver of the vehicle will stop decelerating the vehicle and will instead accelerate the vehicle involves determining whether, for greater than a threshold duration, a torque on a brake of the vehicle exceeds a torque threshold and a rate of change of the torque on the brake is greater than zero.

11. The method of claim 10, wherein determining whether it is predicted that the driver of the vehicle will stop decelerating the vehicle and will instead accelerate the vehicle involves determining, with the at least one forward-looking sensor or the positioning system, whether the vehicle is approaching a stop sign.

12. The method of claim 10, wherein determining whether it is predicted that the driver of the vehicle will stop decelerating the vehicle and will instead accelerate the vehicle involves determining, with the at least one forward-looking sensor or the positioning system, whether the vehicle is approaching a traffic light.

13. The method of claim 10, wherein determining whether it is predicted that the driver of the vehicle will stop decelerating the vehicle and will instead accelerate the vehicle involves determining whether a turn signal of the vehicle is activated.

14. The method of claim 10, wherein determining whether it is predicted that the driver of the vehicle will stop decelerating the vehicle and will instead accelerate the vehicle involves determining, with the at least one forward-looking sensor, whether the vehicle is approaching a second vehicle.

15. The method of claim 14, wherein determining whether it is predicted that the driver of the vehicle will stop decelerating the vehicle and will instead accelerate the vehicle involves determining, with the at least one forward-looking sensor, whether the second vehicle has an acceleration greater than a threshold acceleration.

16. The method of claim 14, wherein determining whether it is predicted that the driver of the vehicle will stop decelerating the vehicle and will instead accelerate the vehicle involves determining, with the at least one forward-looking sensor, whether the vehicle has a speed greater than a threshold speed.

17. The method of claim 10, wherein the at least one forward-looking sensor comprises a camera, radar, or lidar.

18. A vehicle comprising:
   at least one forward-looking sensor disposed within the vehicle;
   a positioning system disposed within the vehicle;
   a processor disposed within the vehicle and configured to:
      during a deceleration of the vehicle, determine, based on inputs from the at least one forward-looking sensor or the positioning system, whether it is predicted that a driver of the vehicle will stop decelerating the vehicle and will instead accelerate the vehicle; and
      if it is predicted that the driver of the vehicle will stop decelerating the vehicle and will instead accelerate the vehicle, inhibit a downshifting of a transmission of the vehicle,
   wherein determining whether it is predicted that the driver of the vehicle will stop decelerating the vehicle and will instead accelerate the vehicle involves determining whether, for greater than a threshold duration, a torque on a brake of the vehicle exceeds a torque threshold and a rate of change of the torque on the brake is greater than zero.

* * * * *